July 24, 1956  B. D. FLOYD  2,755,774
PISTON CUSHIONING ARRANGEMENT
Filed Nov. 5, 1953
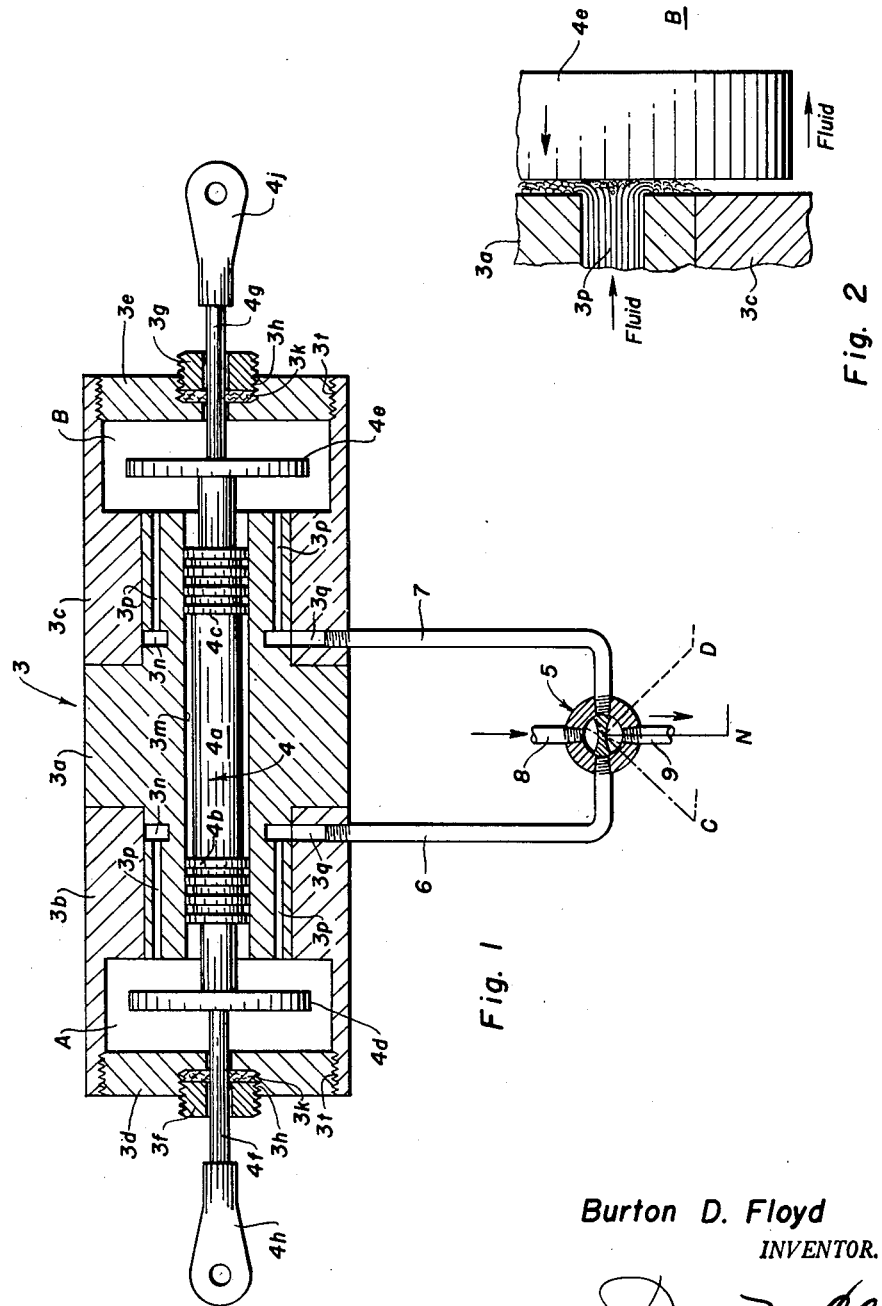
Burton D. Floyd
INVENTOR.
BY James M. Clark
ATTORNEY.

United States Patent Office 2,755,774
Patented July 24, 1956

2,755,774

PISTON CUSHIONING ARRANGEMENT

Burton D. Floyd, Long Beach, Calif., assignor to North American Aviation, Inc.

Application November 5, 1953, Serial No. 390,369

6 Claims. (Cl. 121—38)

The present invention relates in general to shock-absorbing and dash-pot arrangements and more particularly to the dampening and cushioning of the movable members of fluid valves, motors and the like.

This invention is directed more particularly to new and improved arrangements and methods of forming the piston and chamber portions of fluid control valves and servomotors such that an automatic valving or cushioning effect is provided to prevent the movable element from striking against the body of the device at the end of its stroke or movement. The present invention is particularly adapted to new and improved methods of fashioning the head ends of the piston and the head chambers of double-acting fluid motors and the control valve sections of two-stage transfer valves such that an automatic shock absorbing or cushioning effect exists to insure against the movable piston or valve elements hammering against the body or casing at such times as a fluid surge impulse is applied to either of the head chambers thereof such as by the movement of a control or pilot valve.

It has been the practice heretofore that the head ends of the piston of the control valve section of a two-stage transfer valve are formed free so that ostensibly, as regards only the sleeve portion of the valve, the piston could be drawn through the sleeve. While this is satisfactory from the functional standpoint any fluid surge or impulse applied to the piston will however result in its being propelled with great force in the direction indicated by the applied fluid force. It will then be brought up sharply on contact with whatever portion of the valve body first presents itself in its path. This results in creating considerable noise, frequent over-control of the controlled mechanism and it can conceivably result in impairment or destruction of the motor or valve. In such prior devices springs or other resilient means are frequently used to cushion or arrest the movement, but their use has not been entirely satisfactory.

It is, accordingly, a primary object of the present invention to provide an improved arrangement in the movable element and the head chambers of fluid motors and valves such that an automatic cushioning effect is derived which will insure against the movable element striking or hammering against the body of the device at such times as a fluid surge or impulse is applied to the head chamber thereof. It is a corollary objective of this invention to provide a control valve having piston head ends and head chambers arranged to provide an automatic cushioning or damping effect which will insure against the valve piston hammering against the valve body at the end of the stroke or movement. Further objects of the invention will become apparent from the following description, taken in conjunction with the accompanying figures, forming a part hereof, in which:

Fig. 1 represents a cross-sectional view of a fluid-actuated motor of the double-acting type to which a form of the present invention has been applied; and Fig. 2 is an enlarged detailed view of the adjacent fixed and movable portions of the fluid motor of Fig. 1 showing the valving and cushioning effect of the actuating fluid.

In Fig. 1 there is shown a composite cylindrical body formed by the fixed casing or cylinder assembly 3 comprised of the central section 3a and the identical tubular end sections 3b and 3c, each of which is suitably fixed to the oppositely extending reduced diameter portions of the central section 3a. These end sections 3b and 3c have internal bores such that they form the end chambers A and B, respectively, and these sections 3b and 3c are suitably closed by the end plate members 3d and 3e by their threaded engagement with the threads 3t.

The central portion 3a of the casing or housing 3 is provided with a main longitudinal axial bore 3m within which the movable piston assembly 4 is adapted to reciprocate. The latter comprises a main central or intermediate shank portion 4a terminating in the piston portions 4b and 4c each comprising a plurality of annular land portions, which may alternatively be provided with suitable fluid seals within the annular grooves. Outwardly spaced from the piston portions 4b and 4c on reduced diameter extensions of the shank 4a are located the circular plates or discs 4d and 4e which contribute to the improved cushioning effects by serving as valving vanes or gating pistons, as more particularly described below. There is also fixedly attached outwardly of the circular plates 4d and 4e the end shafts 4f and 4g of reduced diameter terminating in the end terminal fittings 4h and 4j serving as linkage connectors by which the device is connected to the member or members to be moved by the fluid motor 3—4. These rods or shafts 4f and 4g extend through the end plugs or bushings 3f and 3g, engaging the cylinder heads or end sections 3d and 3e by means of the threads 3h and retaining the packing 3k therebetween for the prevention of the escape of fluid from the pressure chambers A and B.

The central portion 3a of the housing or casing 3 is provided with a pair of annular chambers 3n which extend peripherally around each of the reduced end portions of the section 3a and communicate with the chambers A and B respectively by means of a plurality of circumferentially arranged parallel and longitudinally extending passages 3p. For the control of the actuating piston 4 within the casing 3, there is provided the pilot or control valve 5 having a plurality of ports, two of which communicate by means of the pipes or conduits 6 and 7 with the radially extending ports 3q formed within the end portions 3b and 3c. A remaining pair of oppositely disposed ports in the valve 5 communicate with the fluid pressure line 8 and with the return line 9, respectively. In the position of the control valve 5 as shown in Fig. 1, the movable element of the valve is in a position in which it blocks the flow from the pressure line 8 to either of the lines 6 and 7 corresponding to a neutral position of its operating handle, indicated by the letter N, and in which the piston assembly 4 is hydraulically locked in the central position shown. It will be understood that with the handle of the control valve 5 moved to the position indicated by the construction line C the fluid pressure from the line 8 will be placed in communication with the control line 7 to the chamber B and the corresponding line 6 will provide the return for the displacement of the fluid from the chamber A into the return line 9. Conversely, as the operating handle of the valve 5 is rotated into the position indicated by the dotted lines at D, the pressure from the conduit 8 will pass through the line 6 into the chamber A whereas displacement from chamber B will be permitted through the line 7 and outwardly through the return line 9, each setting of the valve providing for corresponding movement in either direction of the piston assembly 4 for the movement of the controlled member (not shown) in the desired direction. It will, of course, be understood that the conduit 8 is preferably placed in communication with a suitable pressure source such as a pump or the like, drawing from a reservoir or receiver and that the return line 9 is similarly placed in communication with the reservoir to replenish the fluid which is displaced by the pump.

The operation of the improved device is as follows: Assuming that fluid pressure is applied to the control valve 5 through the pressure conduit 8 and it is desired to move the piston assembly 4 from left to right, as viewed in Fig. 1, to provide a corresponding movement of the controlled member, the handle of the control valve 5 is rotated in the counterclockwise direction to the position indicated by the dotted line D. Correpsonding movement of the vane or partitioning element forming the movable part of the control valve permits fluid under pressure from the conduit 8 to pass through the conduit 6, the corresponding ports and passages 3q, 3n and 3p into the pressure chamber A. At the same time, the chamber B is placed in communication through the corresponding ports and passages 3q, 3n and 3p with the conduit 7 and the return line 9. The greater pressure within the chamber A acting upon the outer exposed surfaces of the piston 4b and the plate 4d causes the piston assembly 4 to move toward the right as viewed in Fig. 1. As the fluid is displaced from the chamber B, as the piston 4c moves toward the same, it is displaced through the parallel longitudinal passages 3p and outwardly through the conduit 7 and the return line 9.

Conversely, in order to cause opposite movement of the piston assembly 4, or from right to left, the handle of the valve is moved to the position indicated by the construction line C, thereby causing fluid under pressure to pass from the conduit 8 through the conduit 7 into the chamber B and to place the opposite chamber A in communication with the return line 9 through the conduit 6. In each of the opposite movements referred to, the piston assembly is gently cushioned at the end or limit of its stroke by the oppositely moving fluid, emerging from the passages 3p, and the corresponding plate or valving vane, either 4d or 4e.

This cushioning of the movable assembly at the end of its stroke may be more clearly illustrated by reference to Fig. 2 corresponding to the approach of the piston assembly 4 to its limit of movement from right to left and showing the cushioning effect as it occurs in chamber B. The surface forming the end of the chamber B, through which the ports 3p are emergent, is smoothly formed and transverse, or normal, to the longitudinal axis of the piston assembly 4. The opposite surface of the plate or vane 4e is similarly formed smooth and normal to the piston axis. The diameter of the plate 4e is such as to extend radially beyond the ports 3p and the ports are so formed that when the piston assembly is moved from right to left the adjacent surface of the plate 4e would effect perfect closure of the ports or passageways 3p. As the fluid under pressure enters the chamber B, it emerges through the ports 3p, increasing the pressure within the chamber B and causing movement of the piston 4c from right to left. As corresponding movement of the plate occurs, there is provided an automatic valving or cushioning effect guarding against contact of the plate 4e with the adjacent surface of the chamber B. This is best illustrated in Fig. 2 in which the fluid passing from left to right through the port 3p within the casing portion 3a impinges upon the approaching surface of the plate 4e, which is moving in the opposite direction, namely, from right to left as indicated by the arrow on the member 4e. As the surface of the plate 4e approaches the wall of the chamber B, the reaction to the forces provided by the jets of fluid emerging from the ports 3p becomes greater and the braking or dash-pot effect upon the entire piston assembly 4 progressively increases until the assembly is gradually brought to a gentle stop at its limiting position at which the surface of the plate 4e comes into physical contact with the wall of chamber B. Impact or shock is accordingly prevented at the end of the stroke only whereas movements at the start and intermediate stages of the stroke are rapid and are not opposed. Inasmuch as the fluid motor assembly is symmetrical and the piston 4e has a similar plate 4d formed at the opposite end of the assembly, operating within a similar chamber A, the piston's motion is cushioned in either direction of travel and complete protection is afforded against the effect of fluid surge impulses introduced into either head chamber A or B from the pilot or control valve 5.

It will be noted that the force with with the plate 4e strikes or bears against the inner end of the chamber B depends upon the flow of fluid under pressure from the ports 3p passing inwardly across the face of the plate 4e and entering the central bore to act upon the piston 4c. Accordingly a point is gradually reached where the liquid capable of passing between the inner wall and the face of the plate 4e acting upon the piston 4c finally cuts itself off and the movement of the plate is gradually brought to a stop without a severe impact. As the movement of the device is reversed and the valve 5 is passed through the neutral position N toward the reversing position C, the pressures within the conduits 6 and 7 pass through a point at which they are each substantially the same or equalized and there is no longer any fluid force tending to cause the plate 4e to bear with any pressure against the inner end of the chamber B. As the pressure gradually builds up in the conduit 6 and the conduit 7 is open to the return portion of the system, the plate 4e is caused to move away from the inner ends of the chamber B by the force exerted through its connection with the piston 4c and the piston assembly 4. Inasmuch as the fluid pressure entering chamber A and exerted upon the piston 4b and the differential area on the outer face of the plate 4d is at least equal to the force which previously caused the plate 4e to bear upon the end of the chamber B but is now greater due to the reduction in the pressure within the port 3p and on the adjacent face of the plate 4e, any tendency of the plate 4e to remain against the end wall of the chamber B is overcome and the piston assembly is caused to move toward the right until its movement is gradually arrested in a similar manner by the choking off of the pressure flow from the ports 3p by the approaching surface of the plate 4d gradually metering and interrupting the flow completely into the central bore against the piston 4b. Accordingly, while the liquid within the chambers A and B is substantially trapped, or in other words is merely displaced from one face of the respective metering plate to the other, the plates themselves are readily started upon their return strokes due to the application of a greater fluid force than that which previously held them against the respective inner ends of these chambers.

Other forms and modifications of the present invention, which will occur to those skilled in the art after reading the foregoing description, are intended to come within the scope and spirit of this invention as more particularly set forth in the appended claims.

I claim:

1. A device comprising a casing having a bore and a fluid chamber in communication therewith, a piston reciprocably disposed within said casing bore, said piston having a disc portion disposed within said chamber, and a fluid port within said casing disposed such that fluid emerging from said port into said chamber is directed against the disc portion of said piston for arresting the movement thereof.

2. A fluid-actuated device comprising a casing having a bore and an adjacent fluid chamber open thereto, a piston assembly having a piston portion reciprocably disposed within said casing bore, said piston assembly having a disc portion disposed within said fluid chamber, and a pressure fluid port within said casing in communication with said fluid chamber for the movement of said piston assembly disposed such that pressure fluid emerging from said port into said fluid chamber is also directed against the said disc portion of said piston assembly for arresting the said movement thereof at the end of its stroke.

3. A fluid-actuated device comprising a casing having an axial bore and a fluid chamber in communication therewith, a piston assembly having a piston portion reciprocably disposed within said casing bore, said piston assembly having a disc portion movably disposed within said chamber, and a fluid port within said casing in communication with said chamber disposed substantially parallel to the axis of said casing bore such that fluid emerging from said port into said chamber for the actuation of said piston portion is directed against the disc portion of said piston assembly for the arrest of said piston assembly at the end of its actuated movement.

4. In a fluid-actuated device, a casing having an axial bore and a chamber formed therein, a movable member having a piston portion reciprocably mounted within said bore, said movable member having a plate portion disposed within said chamber, and a port within a wall of said chamber for the supply of fluid under pressure thereto for the movement of said movable member, the said port within said chamber wall being arranged such that the fluid under pressure is directed against said plate portion in an opposite direction to that direction imparted by the fluid to said movable member for cushioning the approach of said plate portion to the end of said chamber.

5. In a fluid-actuated device, a relatively fixed casing having an axial bore and a chamber formed therein, a movable piston member reciprocably disposed in a fluid-tight relationship within said axial bore, said piston member having a plate portion freely movable within said chamber, and a port within a wall of said chamber for the supply of fluid under pressure thereto for the movement of said movable piston member in a first direction, the said port within said chamber wall being arranged such that the fluid under pressure is directed in an opposite direction to that first direction imparted by the fluid to said movable piston member whereby as said movable piston member approaches said chamber wall containing said port its striking thereagainst is cushioned by the opposite flow of the pressure fluid through said port.

6. In a fluid-actuated device, a relatively fixed casing having a chamber formed therein, a movable piston member reciprocably disposed within said chamber, said member having a plate portion freely movable within said chamber, and a port within a wall of said chamber for the supply of fluid under pressure thereto for the movement of said movable member in a first longitudinal direction, the said port within said chamber wall being arranged such that the fluid under pressure is directed in an opposite direction to that first direction against said plate portion whereby as said movable piston member is actuated said plate portion approaches said chamber wall and is cushioned from striking thereagainst by said opposite flow of said fluid.

References Cited in the file of this patent

UNITED STATES PATENTS

| | | |
|---|---|---|
| 1,249,736 | Frink | Dec. 11, 1917 |
| 1,257,369 | Lower | Feb. 26, 1918 |
| 1,878,361 | Ackerman | Sept. 20, 1932 |
| 2,053,797 | King | Sept. 8, 1936 |